(12) United States Patent
Forman

(10) Patent No.: US 6,438,224 B1
(45) Date of Patent: Aug. 20, 2002

(54) TONE DETECTION

(75) Inventor: Lance Forman, Northbridge, MA (US)

(73) Assignee: NMS Communications Corporation, Framingham, MA (US)

( * ) Notice: Subject to any disclaimer, the term of this patent is extended or adjusted under 35 U.S.C. 154(b) by 0 days.

(21) Appl. No.: 09/190,978

(22) Filed: Nov. 12, 1998

(51) Int. Cl.[7] .............................................. H04M 3/00
(52) U.S. Cl. ................... 379/386; 379/142.18; 379/418
(58) Field of Search ....................... 379/93.26, 142.18, 379/386, 418

(56) References Cited

U.S. PATENT DOCUMENTS 4,521,647 A * 6/1985 Olson et al. ................ 379/386
5,528,663 A * 6/1996 Locke et al. ................ 379/386

* cited by examiner

Primary Examiner—Forester W. Isen
Assistant Examiner—Jefferey Harold
(74) Attorney, Agent, or Firm—Mintz, Levin, Cohn, Ferris, Glovsky and Popeo, P.C.

(57) ABSTRACT

Signaling tone detection systems are presented that may allow for reductions in talk-off, cut-through, or both. In one general aspect, a detection system includes an outgoing signaling tone detector responsive to an output from a first station to a communication channel. An incoming signaling tone detector is responsive to an input to the first station from the communication channel. A sensitivity control input of the incoming signaling tone detector is responsive to a detection output of the outgoing signaling tone detector. This and other configurations may allow a system to detect tones more reliably, or they may allow a system with particular computational capabilities to detect more tones with a similar level of accuracy.

26 Claims, 7 Drawing Sheets

TONE DETECTION

FIELD OF THE INVENTION

This invention relates generally to tone detection on full-duplex communication channels, such as telephone lines, and more particularly to methods and apparatus for reducing talk-off and cut-through in the detection of signaling tones, such as DTMF tones.

BACKGROUND OF THE INVENTION

A number of different types of telephonic equipment communicate control information by sending and detecting signaling tones. The Dual-Tone, Multi-Frequency (DTMF) standard is an extensively-used standard for some of these signaling tones. It defines 16 different tone pairs (digits) that are each made up of a low tone and a high tone. The low tone can be a 697 Hz, 770 Hz, 852 Hz, or 941 Hz tone, and the high tone can be a 1209 Hz, 1336 Hz, 1477 Hz, or 1633 Hz tone. A variety of different kinds of circuits exist to detect these tone pairs, including digital filters.

Tone detectors sometimes suffer from "talk-off." Talk-off occurs when a signal, such as person's voice, is decoded as a tone. This can happen when part of the telephone system is waiting for a signaling tone and sounds in the signal coincidentally include the two tones defined as one of the DTMF tone pairs.

Some tone detectors can also fail to detect tones because of what is known as "cut-through." DTMF detectors that suffer from cut-through generally detect tones by comparing the magnitude of the energy in the tone frequency ranges with the magnitude of the energy outside of the tone ranges. These detectors may miss signaling tones in the presence of other sounds on the telephone line.

SUMMARY OF THE INVENTION

In one general aspect, the invention features a communication signaling tone detection system that includes an outgoing signaling tone detector responsive to an output from a first station to a communication channel. An incoming signaling tone detector is responsive to an input to the first station from the communication channel. A sensitivity control input of the incoming signaling tone detector is responsive to a detection output of the outgoing signaling tone detector.

In preferred embodiments, the incoming and outgoing signal tone detectors can be DTMF detectors. A CODEC can be operatively connected between an output of the outgoing signaling tone detector, an input of the incoming signaling tone detector, and the communication channel. The communication channel can be connected to an analog public network telephone line. The outgoing signaling tone detector can be less sensitive than the incoming signaling tone detector. The signaling tone detectors can both be implemented as digital filters. The detection output of the outgoing signaling tone detector can be operative to indicate which of a plurality of predetermined signaling tones the detector has received.

In another general aspect, the invention features a method of detecting signaling tones from a communication channel that includes detecting outgoing signaling tones in a communication stream transmitted from a first station over the communication channel to a second station, detecting incoming signaling tones in a communication stream transmitted from the second station over the communication channel to the first station, and altering at least one attribute of the step of detecting incoming signaling tones based on whether signaling tones are detected by the step of detecting outgoing signaling tones.

In preferred embodiments, the steps of detecting can detect DTMF tones as the signaling tones. The step of altering can decrease the sensitivity of the step of detecting when the outgoing signaling tones are detected by the step of detecting spurious signals. The step of altering can temporarily disable the step of detecting. The step of altering can invalidate a result of the step of detecting incoming signaling tones when a same signaling tone is detected by both the step of detecting outgoing signaling tones and the step of detecting incoming signals. The communication stream can be an audio stream. The step of detecting outgoing tones can be less accurate than the step of detecting incoming tones.

In a further general aspect, the invention features a communication signaling tone detection system that includes means for detecting outgoing signaling tones in a communication stream transmitted from a first station over the communication channel to a second station, means for detecting incoming signaling tones in a communication stream transmitted from the second station over the communication channel to the first station, and means for altering at least on attribute of the step of detecting incoming signaling tones based on whether outgoing signaling tones are detected by the means for detecting outgoing signaling tones.

In preferred embodiments, The means for detecting can detect DTMF tones as the signaling tones. The means for altering can include means for decreasing the sensitivity of the step of detecting when the outgoing signaling tones are detected by the means for detecting outgoing signals. The means for altering can include means for temporarily disabling the means for detecting incoming signals. The means for altering can include means for invalidating a result of the means for detecting incoming signals when a same signaling tone is detected by both the means for detecting outgoing signaling tones and the means for detecting incoming signaling tones. The means for detecting outgoing tones can be less accurate than the means for detecting incoming tones.

In another general aspect, the invention features a communication signaling tone detection system that includes a signal characteristic value detector responsive to a communication channel during a measurement period, threshold storage responsive to the signal characteristic value detector, and a threshold detector that is responsive to the threshold storage and to the communication channel during a detection period, and that has a signaling tone reporting output.

In preferred embodiments, the threshold detector can be a DTMF detector. The signal characteristic value detector can be an amplitude detector. The signal characteristic value detector can be a twist detector. The threshold detector can be operative to leave a margin between a threshold value stored by the signal characteristic detector and a detection threshold value. The signal characteristic detector and the threshold detector can be implemented using a digital signal processor.

In a further general aspect, the invention features a communication signaling tone detection system that includes means for measuring a characteristic of a signal while a signaling tone is present on the channel, and for defining a threshold based on the characteristic. The system also includes storage for storing the threshold, and signaling tone detection means responsive to the means for measuring and to the communication channel to detect when a signal on the communication channel exceeds the threshold.

In preferred embodiments, the signal tone detector can be a DTMF detector. The signal characteristic of the signaling tone can be an amplitude of the signaling tone. The signal characteristic of the signaling tone can be a twist value of the signaling tone. The signaling tone detector and the means for measuring and detecting can be implemented using a digital signal processor.

In another general aspect, the invention features a method of detecting signal tones from a communication channel that includes measuring a characteristic of a signal on the communication channel while a first signaling tone is present on the channel, adjusting a detection threshold based on the characteristic measured in the step of measuring, and detecting a second signaling tone according to the adjusted threshold.

In preferred embodiments, the steps of measuring and adjusting can measure and adjust an energy detection threshold. The steps of measuring and adjusting can measure and adjust a twist threshold. The step of measuring can take place while only the signaling tone is present on the communication channel. The method can further include the steps of setting up a first session on the communication channel before the step of measuring, shutting down the first session on the communication channel after the step of detecting, setting up a second session on the communication channel after the step of shutting, and repeating the steps of measuring, adjusting, and detecting after the step of setting up a second session.

In a further general aspect, the invention features a communication signaling tone detection system that includes an outgoing energy detector responsive to an output from a first station to an interface circuit for a communication channel, the outgoing signaling tone detector having a detection output, a incoming energy detector responsive to an input to the first station from the interface circuit, the incoming signaling tone detector having a sensitivity control input, a trans-hybrid loss measurement module responsive to the interface circuit, a trans-hybrid loss correction module responsive to the incoming signaling tone detector, to the outgoing signaling tone detector and to the trans-hybrid loss measurement module, and a signaling tone detector responsive to the trans-hybrid loss correction module.

In preferred embodiments, the incoming energy detector, the outgoing energy detector, and the trans-hybrid measurement module can be responsive to energy in each of a number of frequency bands. The incoming energy detector, the outgoing energy detector, and the trans-hybrid measurement module can be responsive to energy in each of a number of frequency bands defined by the DTMF standard. The trans-hybrid loss connection module can be operative without phase information. The trans-hybrid loss connection module and the signaling tone detector can both be implemented with a signal processor.

In another general aspect, the invention features a communication signaling tone detection system that includes means for measuring a communication parameter of a communication channel, means for adjusting the received signal parameter a signal received from the communication channel according to the measured communication parameter, and means for detecting signaling tones using the adjusted received signal parameter.

In preferred embodiments, the means for measuring can be for measuring trans-hybrid loss. The signal parameter can be signal energy and the means for adjusting can include means for correcting the signal energy for trans-hybrid loss. The communication parameter can be measured for each of a number of frequency bands. The means for measuring can measure the communication parameter for members of each of two groups of frequency bands defined by the DTMF standard. The system can include means for initiating the means for adjusting before sending an audio signal from a first station to a second station over the communication channel during which tones are to be detected from the second station at the first station.

In another general aspect, the invention features a method of detecting signal tones from a communication channel that includes measuring a communication parameter of the communication channel, measuring a signal parameter of a signal received from the communication channel, adjusting the received signal parameter according to the measured communication parameter, and detecting signaling tones using the adjusted received signal parameter.

In preferred embodiments, the communication parameter can be trans-hybrid loss. The signal parameter can be signal energy and the step of adjusting can include correcting the signal energy for trans-hybrid loss. The communication parameter can be measured for each of a number of frequency bands. The communication parameter can be measured for members of each of two groups of frequency bands defined by the DTMF standard. The step of adjusting can be initiated before sending an audio signal from a first station to a second station over the communication channel during which tones are to be detected from the second station at the first station. The step of measuring can take place during call set-up.

In a further general aspect, the invention features a communication signaling tone detection system that includes a tone filter having an input responsive to a source of communication signals, a full-duplex communication channel having a first end that has an input responsive an output of the tone filter, and a tone detector responsive to an output of the first end of the communication channel.

In preferred embodiments, the source of outgoing communication signals can include message storage. The tone filter can be constructed and adapted to filter signals from the source in real time. The tone filter can be constructed and adapted to filter signals from the source and store them for later transmission over the communication channel. The filter can be adapted to operate when the system has a predetermined resource availability level. The source can be connected to the communication channel via the filter. The filter can be adapted to filter all DTMF signal tone component frequencies from the source. The filter can have a control input responsive to the tone detector.

In another general aspect, the invention features a communication signaling tone detection system that includes means for filtering signal tone frequencies from communication signals to be transmitted on the communication channel from a first end to a second end, and means for detecting signal tones, including the tone frequencies received from the first end of the communication channel.

In preferred embodiments, the system can include a source of outgoing communication signals that include means for storing messages. The means for filtering can be for filtering signals in real time. The means for filtering can be for filtering signals and storing them for later transmission over the communication channel. The means for filtering can be for filtering all DTMF signal tone component frequencies from the signal. The means for filtering can be responsive to the means for detecting tones. The means for filtering and the means for detecting can be adapted to respectively filter and detect DTMF tones.

In a further general aspect, the invention features a method of detecting signal tones from a communication channel that includes filtering a signal in real time to eliminate at least one frequency component associated with signaling tones, sending a filtered signal resulting from the step of filtering out over a communication channel, and detecting signaling tones from the communication channel as the filtered signal is being sent over the communication channel.

In preferred embodiments, the step of filtering can take place as the signal is received from the communication channel. The step of filtering can take place as the signal is transmitted over the communication channel. The step of filtering can overlap with retrieval of the signal from storage. The step of filtering can take place when a predetermined amount of processing resources are available. The step of filtering and the step of detecting can be applied to all DTMF tone component frequencies.

In another general aspect, the invention features a method of detecting signal tones from a communication channel that includes detecting signaling tones in a signal, and selectively filtering a signal to eliminate at least one frequency component associated with signaling tones in response to detection of signaling tones in the signal by the step of detecting, and detecting signals from the selectively filtered signal. In preferred embodiments, the step of filtering and the step of detecting can be applied to DTMF tones.

Systems according to the invention may be advantageous in that they allow for reductions in talk-off, cut-through, or both. These reductions may allow a system to detect tones more reliably, or they may allow a system with particular computational capabilities to detect more tones with a similar level of accuracy.

DETAILED DESCRIPTION OF AN ILLUSTRATIVE EMBODIMENT

Figure 1:
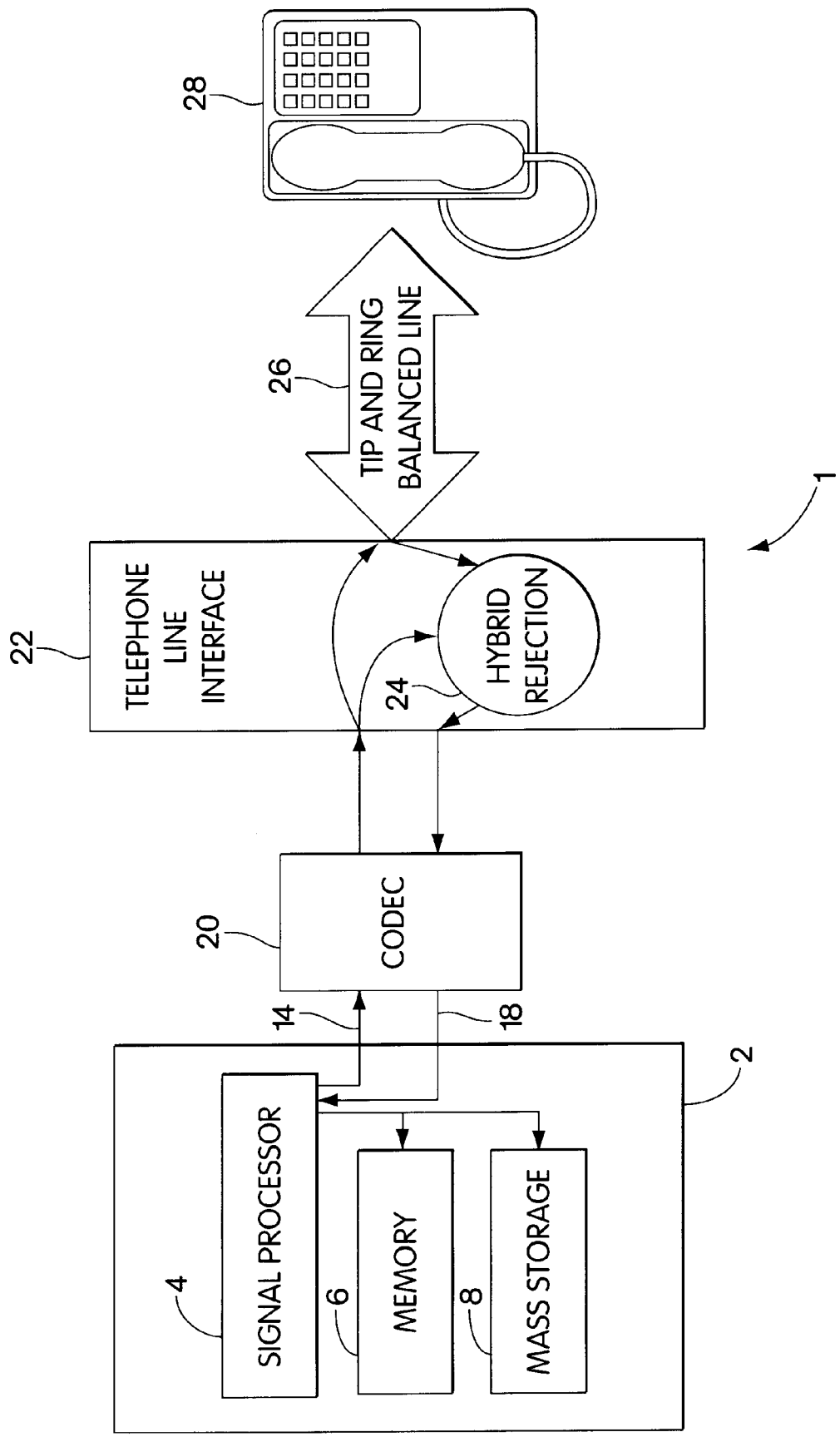
FIG. 1 is a diagram of a communication system according to the invention.

Referring to FIG. 1, a communication system 1 according to the invention can include a signal processing system 2, which can include signal processor 4, such as a digital signal processor (DSP). The signal processing system can also include memory 6, such as random access memory (RAM) and mass storage 8, such as one or more hard drives. The DSP processor can be used to implement various signal processing constructs, such as filters, tone generators, power level detectors, as well as to provide for the overall control flow of the various components in the system. Using these constructs, the system can be used to implement different types of applications, such as voice mail systems an interactive voice response (IVR) systems.

An outgoing simplex communication line 14 is also operatively connected from the digital processing system to an input of a coder-decoder (CODEC) 20, and an output of the CODEC is operatively connected to an incoming simplex communication line 18. The CODEC has an output operatively connected to an input of a telephone line interface 22 and an input responsive to an input of the telephone line interface. As is conventional, the telephone line interface includes hybrid rejection circuitry 24, and can be connected to further stations (e.g., a telephone set 28 or a central office) via a conventional Tip and Ring balanced line 26.

This DSP-based platform may be used to implement one or more of the various configurations of the invention presented in connection with FIGS. 2–8. Although these figures present different facets of the invention, it is contemplated that these facets may be combined in various ways and that they will cooperate favorably with each other when combined. In addition, although the configurations depicted below are described in connection with DTMF tones, they may also be suitable for other types of signal tones. Other types of systems may implement the various facets of the invention in different ways, such as with dedicated analog circuitry.

Figure 2:
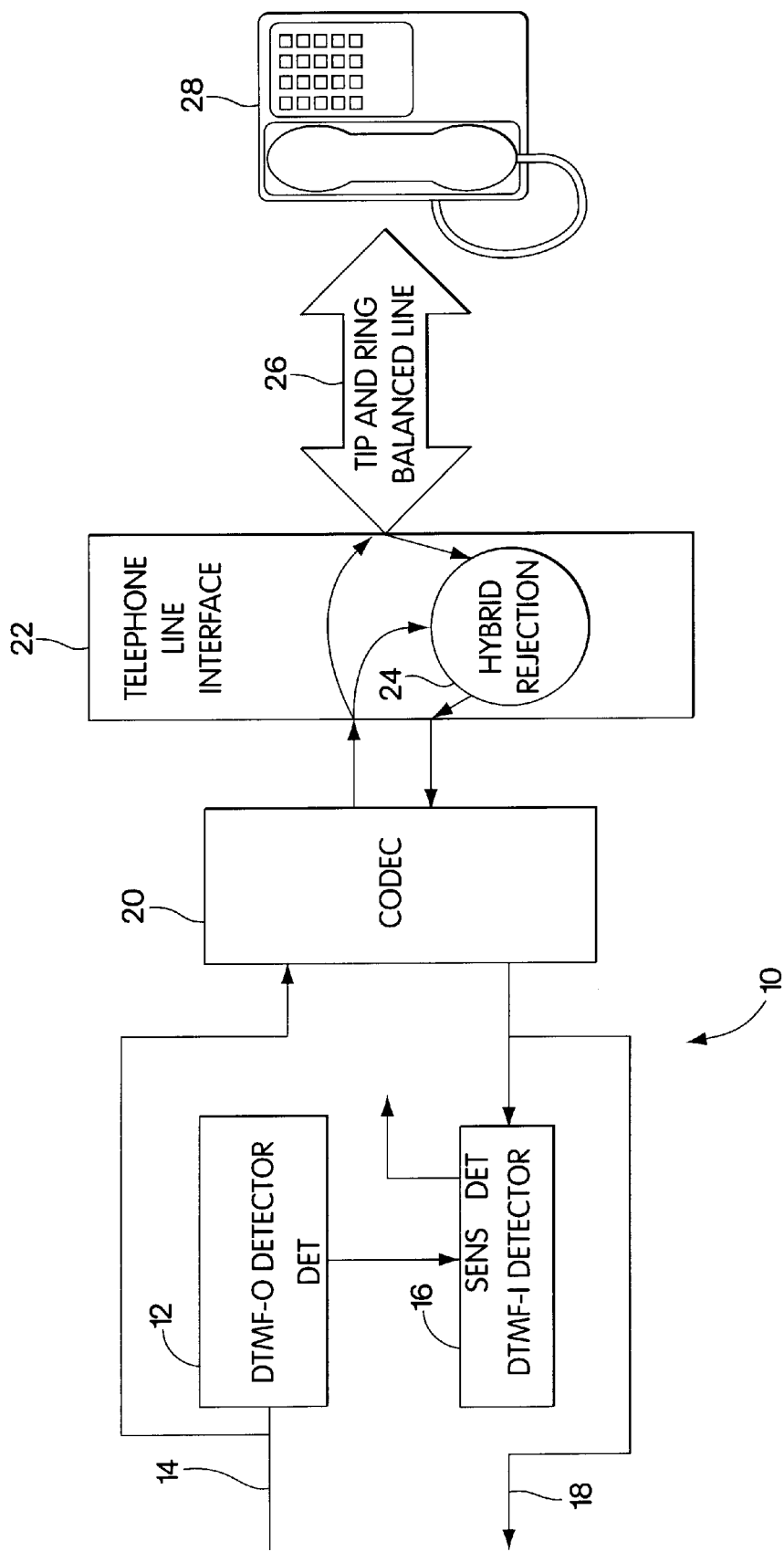
FIG. 2 is a diagram illustrating salient portions of a first configuration of a tone detection system according to the invention, which can be implemented within the communication system of FIG. 1.

Referring to FIG. 2, a first detector configuration 10 includes an outgoing DTMF tone detector 12 having a detection input operatively connected to the outgoing communication line 14. An incoming DTMF tone detector 16 has a detection input operatively connected to the incoming communication line 18. The outgoing DTMF detector has a detection output provided to a control input of the incoming DTMF detector.

In operation, the outgoing DTMF detector 12 monitors the output signal on the output line 14 and the incoming DTMF detector 16 monitors the input signal on the input line 18. When the incoming DTMF detector detects a tone pair (step 100), it determines if the same digit was detected at the outgoing DTMF detector (step 102). If the same digit was detected by both detectors, the incoming DTMF detector considers this detection a false detection, and does not report any signaling tone (step 104). If there is no corresponding detection of the same digit at the outgoing DTMF detector, the incoming DTMF detector reports the newly-received digit as a valid detected digit tone pair (step 106). This approach to reducing talk-off can be used with DSP implementations of DTMF detection, but it can also be used for other types of DTMF detectors, such as analog detectors. The outgoing DTMF detector does not need to be as sensitive as the incoming DTMF detector, allowing it to be implemented less expensively.

Figure 4:
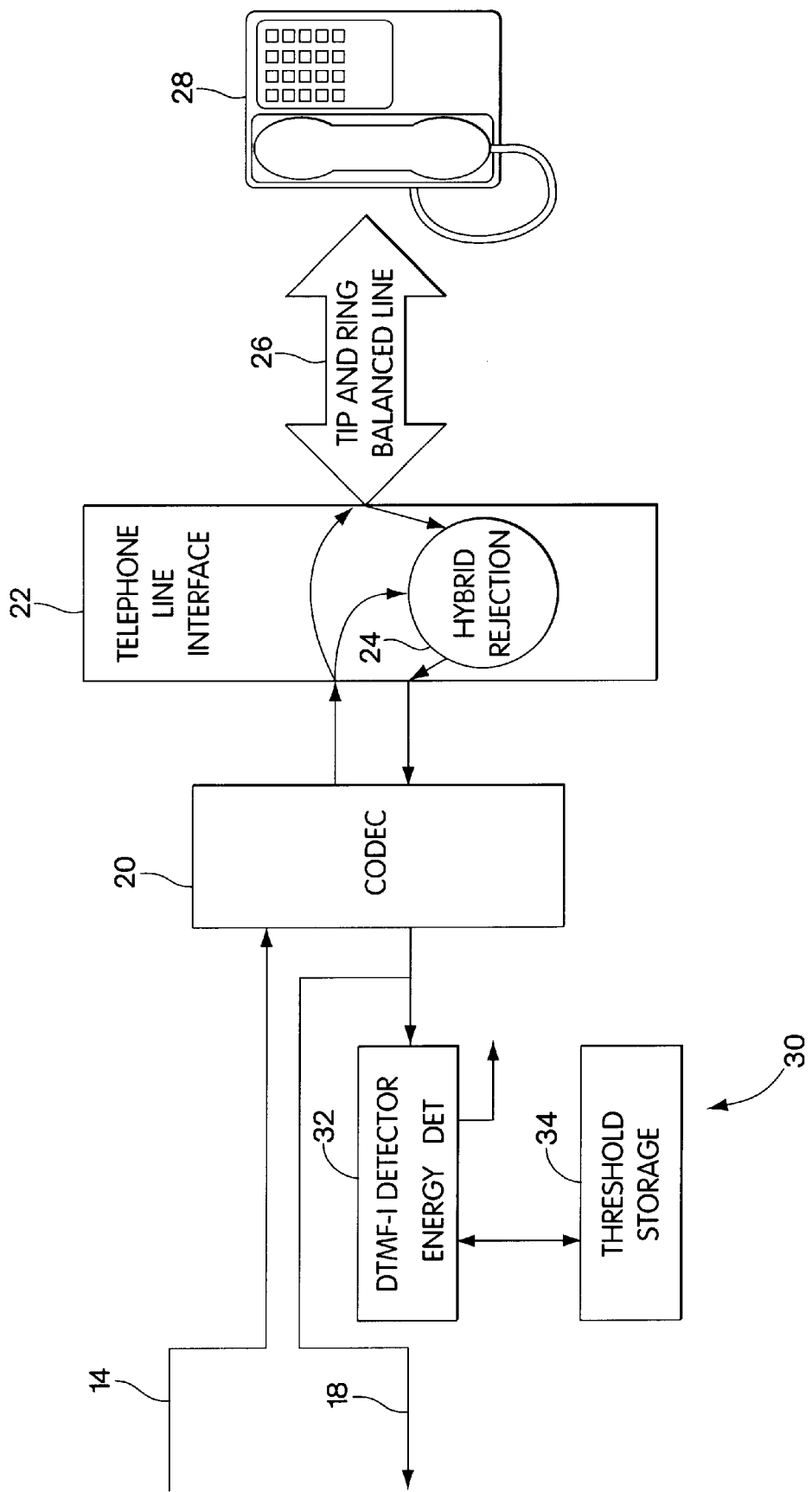
FIG. 4 is a diagram illustrating salient portions of a second configuration of a tone detection system according to the invention, which can be implemented within the communication system of FIG. 1.

Referring to FIG. 4, a second configuration 30 includes a DTMF detector 32 that has an energy level output provided to an input of a threshold storage unit 34. The DTMF detector has a detection input operatively connected to the incoming line 18.

Figure 5:
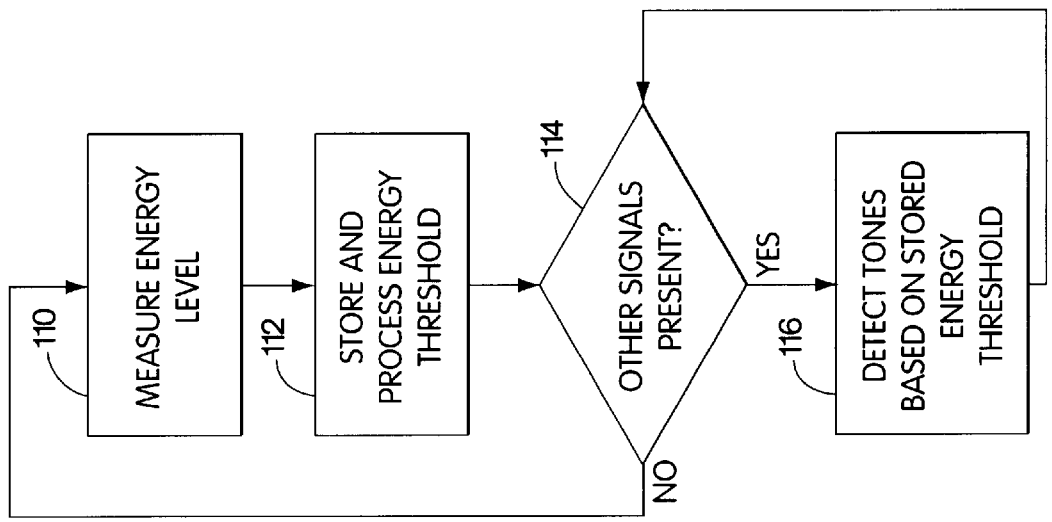
FIG. 5 is a flow chart illustrating the operation of the configuration of FIG. 4.
Figure 3:
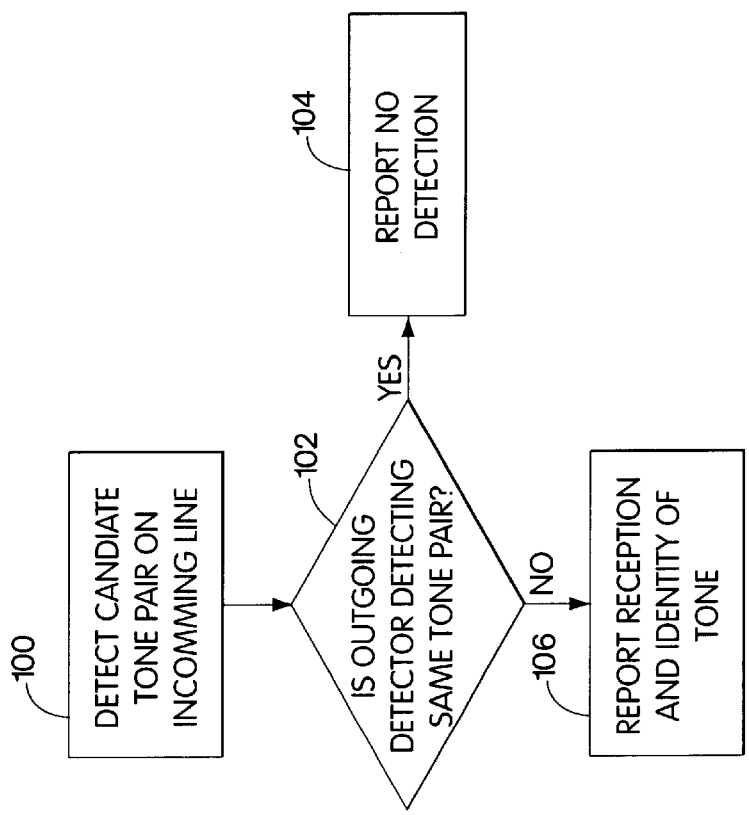
FIG. 3 is a flow chart illustrating the operation of the configuration of FIG. 2.

In operation, referring to FIGS. 4 and 5, the DTMF detector 32 can be put in a mode in which it tracks the average power of tone pairs (steps 110–112). This mode is enabled when no other signal is present on the incoming line 18, at least in the tone frequency ranges. In a voice-mail application, for example, the tracking mode can be enabled when the system is not recording a message. In systems where trans-hybrid loss exists, tracking mode may also be enabled only when the system is not sending an output signal on the outgoing line 14.

In tracking mode, the detector may detect one or more tones. When a single tone, or tone pair, is detected, a value corresponding to its energy level is stored as a threshold for later use. When multiple tones, or tone pairs, are detected in one or more tracking phases, their energy levels may be averaged, thresholded to yield a minimum level, or otherwise processed to obtain a threshold.

When a signal is present, or is likely to be present, on the incoming line 18 (step 114) and tracking mode is therefore disabled, the threshold from the earlier tracking mode is used to qualify the detection of the tone pair. In this operating mode, the detector determines whether received candidate tone pairs contain as least as much energy as the average tone-pair power determined in tracking mode, minus a preset margin (step 116). The magnitude of the preset margin should be determined experimentally for particular embodiments, and this margin may be reduced if more than one digit is received during the tracking phases. If only a single digit was received, a comfortable margin may be around six to eight decibels.

Figure 6:
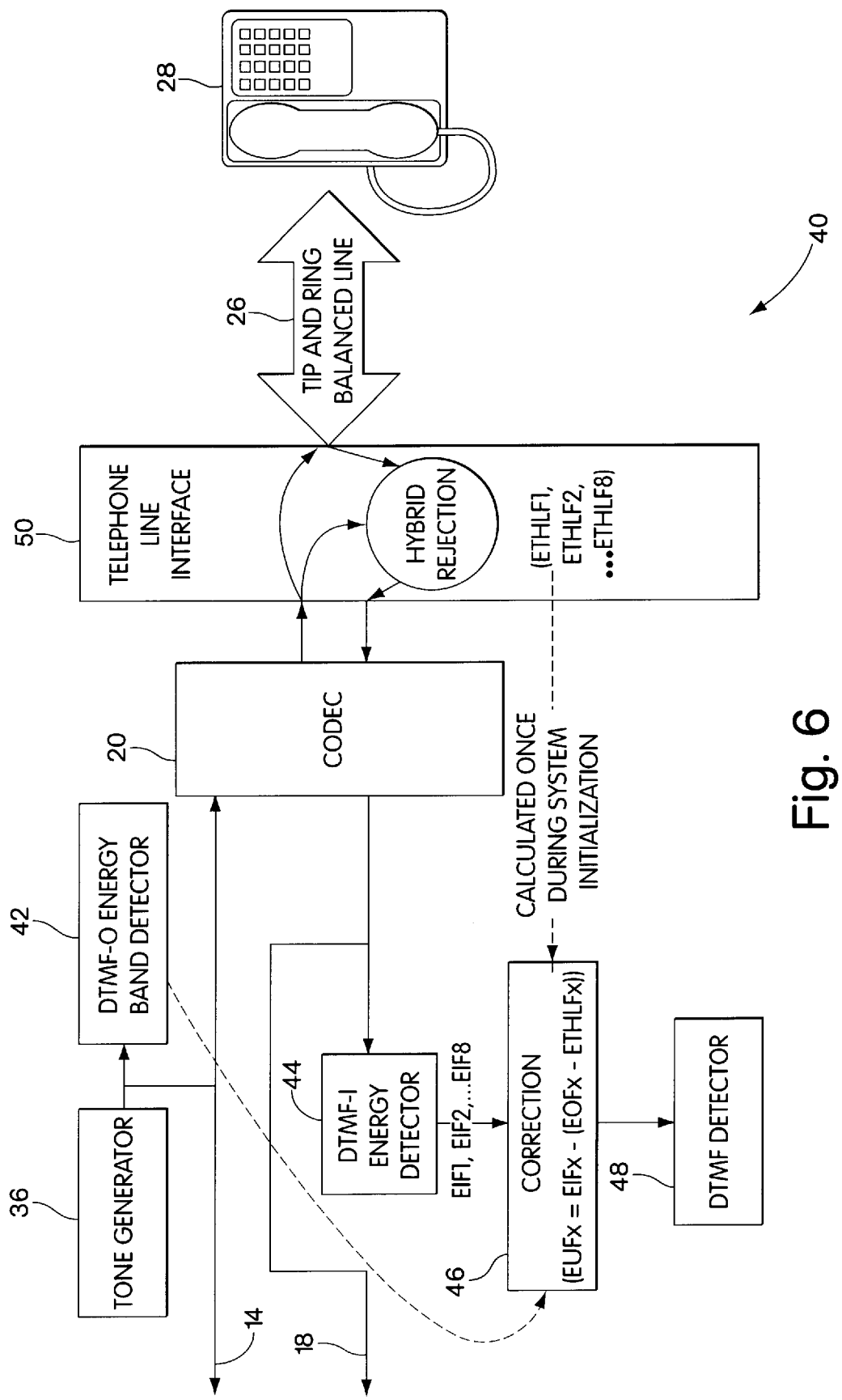
FIG. 6 is a diagram illustrating salient portions of a third configuration of a tone detection system according to the invention, which can be implemented within the communication system of FIG. 1.

Referring to FIG. 6, a third configuration 40 includes an outgoing DTMF energy band detector 42 responsive to the outgoing line 14. An incoming DTMF energy detector 44 has a detect input operatively connected to the incoming line 18, and has an output provided to a trans-hybrid loss correction module 46. The trans-hybrid loss correction module also receives energy band detector values from the DTMF output detector and measured hybrid loss values from the telephone line interface 50, which can be stored values obtained from power measurements made by the system during initialization. The correction module has an output provided to a detect input of a DTMF detector 48. A tone generator 36, which may be available in all configurations, is shown operatively connected to the outgoing line.

Figure 7:
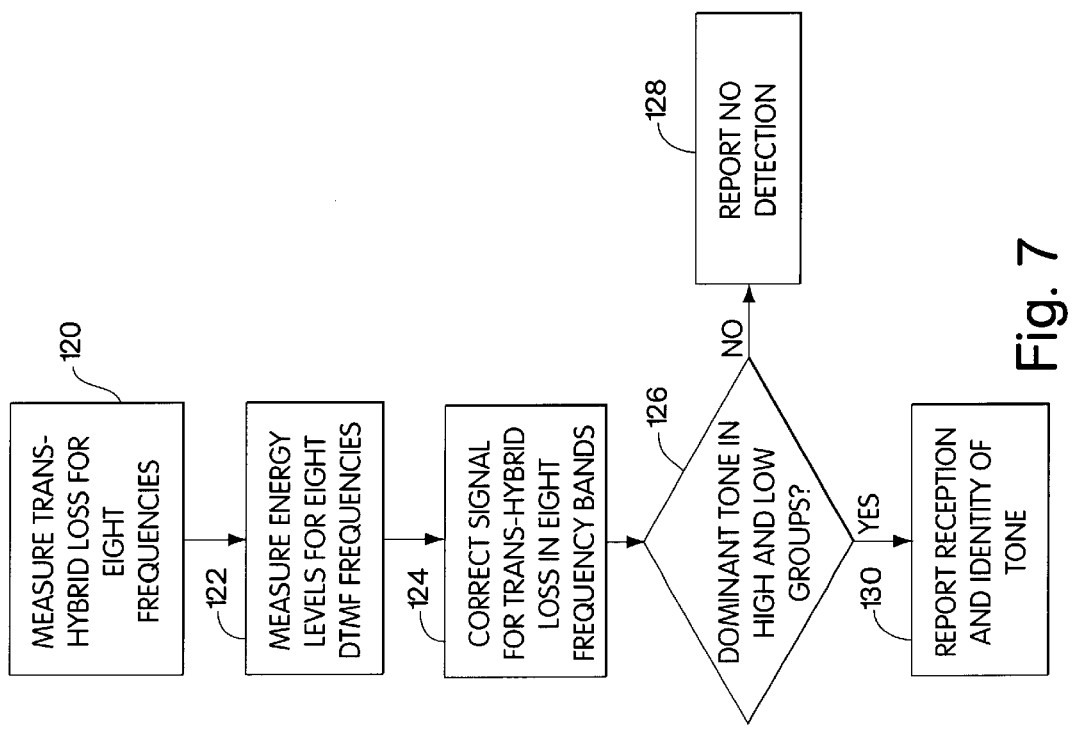
FIG. 7 is a flow chart illustrating the operation of the configuration of FIG. 6.

In operation, referring to FIGS. 6 and 7, the system measures the trans-hybrid loss for the local loop, preferably during power-up or in response to a line test command (ETHLF1-ETHLF8) (step 120). The interface can begin this trans-hybrid loss measurement by first establishing a connection with the local office, such as by calling a telephone-company-provided quiet termination line, by calling another of its own lines, or by going "off-hook" and then dialing a single digit to exit the dial tone state. This connection having been established, the system can use its tone generator 36 to generate one or more tones at a predetermined power level and measure the return energy of that tone using its output energy detector. This provides it with the information needed to compute and store the trans-hybrid local loss. Remote trans-hybrid loss measurements can also be performed at call initialization, although it is believed that local trans-hybrid loss will account for the bulk of the talk-off events in most situations.

After initialization, the DTMF output energy band detector 42 measures the energy levels for the eight DTMF frequencies on the outgoing line 14 (EOF1–EOF8), and the DTMF input energy detector 44 measures the energy level of the eight DTMF frequencies on the incoming line 18 (EIF1–EIF8) (step 122). The correction module 46 corrects the incoming signal based on the input and output energy within the DTMF frequency band, and the trans-hybrid loss ((EUF1 . . . EUF8)=(EIF1 . . . EIF8)−((EOF1 . . . EOF8)−(ETHLF1 . . . ETHLF8))) (step 124). This detection can take place during a "play" state.

The DTMF detector 48 then determines from the energy level measurements whether there is a dominant tone in each of the low and high groups in the corrected signal (step 126). If a dominant tone is detected in both groups, the reception and identity of the DTMF tone are reported (step 130). If a dominant tone is not detected in both groups, no detection is reported (step 128). Note that this approach does not require phase information and that a signal processor can perform the correction and signal tone detection. Also note that this approach permits the DTMF detector to be adjusted to have a reduced sensitivity, and still detect tones with similar or higher levels of accuracy, but with reduced talk-off. In one embodiment, this detection mode is only enabled during playback.

Figure 8:
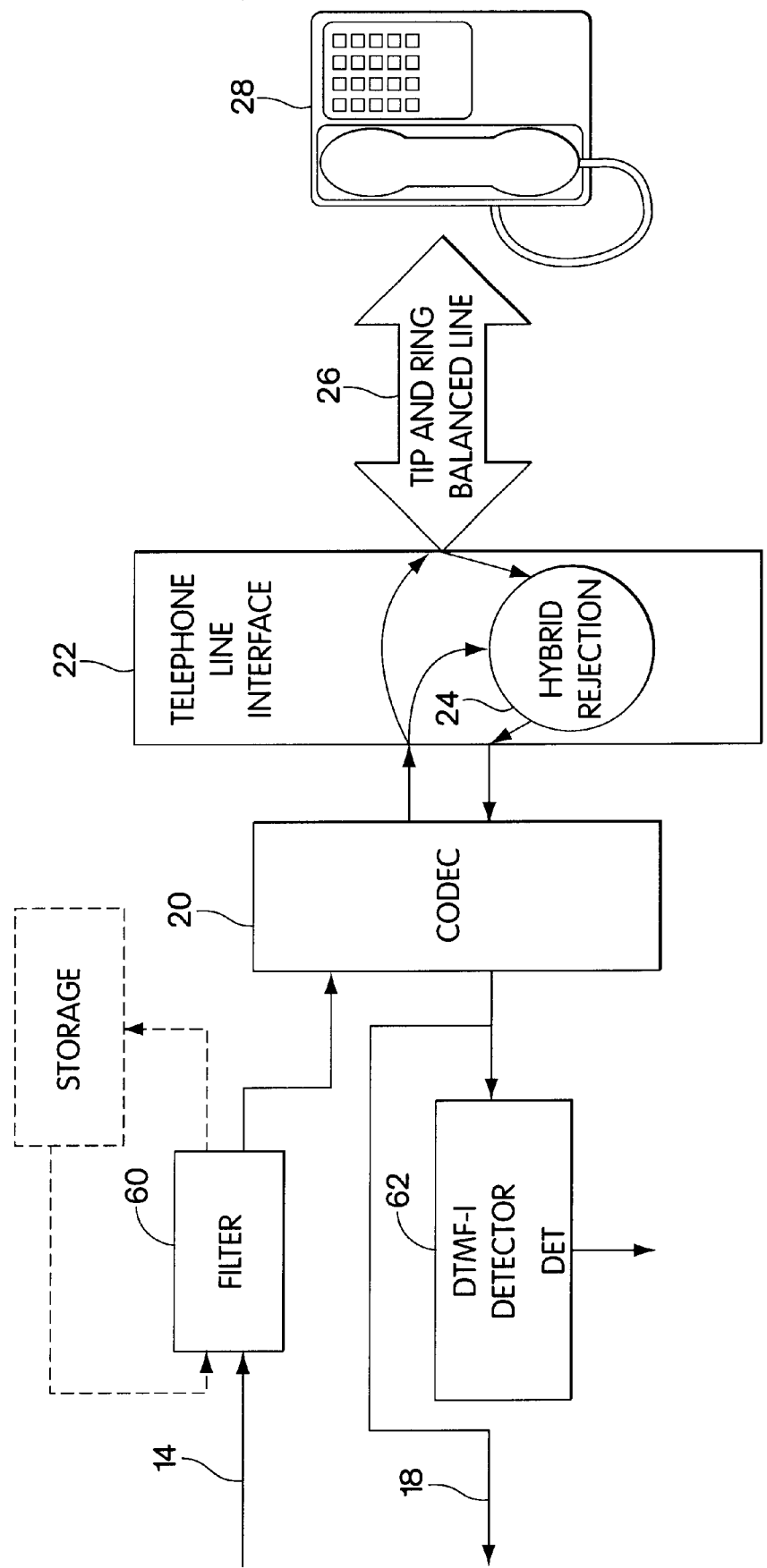
FIG. 8 is a diagram illustrating salient portions of a fourth configuration of a tone detection system according to the invention, which can be implemented within the communication system of FIG. 1.

Referring to FIG. 8, a fourth configuration includes a filter 60 operatively connected in the outgoing line 14. This filter can be configured to process outgoing signals in real time, to background process locally-stored signal data to be sent out at a later time, or both. It can be a comb filter, an adjustable notch filter, or the like. A DTMF detector 62 is operatively connected to the incoming line 18.

The filter 60 can be configured to filter out at least all the tones in one of the groups from the outgoing voice signals transmitted by the system in real time. In a voice mail application, for example, prompts and messages that are played back are filtered as they are presented to the listener. This can essentially eliminate speech transmitted by the system as a source of talk-off in the system.

It may also be advantageous to pre-filter voice prompts or other frequently-repeated signals, so that they do not have to be filtered in real time. One way to do this is to filter all eight DTMF frequencies with a comb filter. This filtering can be performed in combination with real-time filtering of message playback, or by itself.

Figure 9:
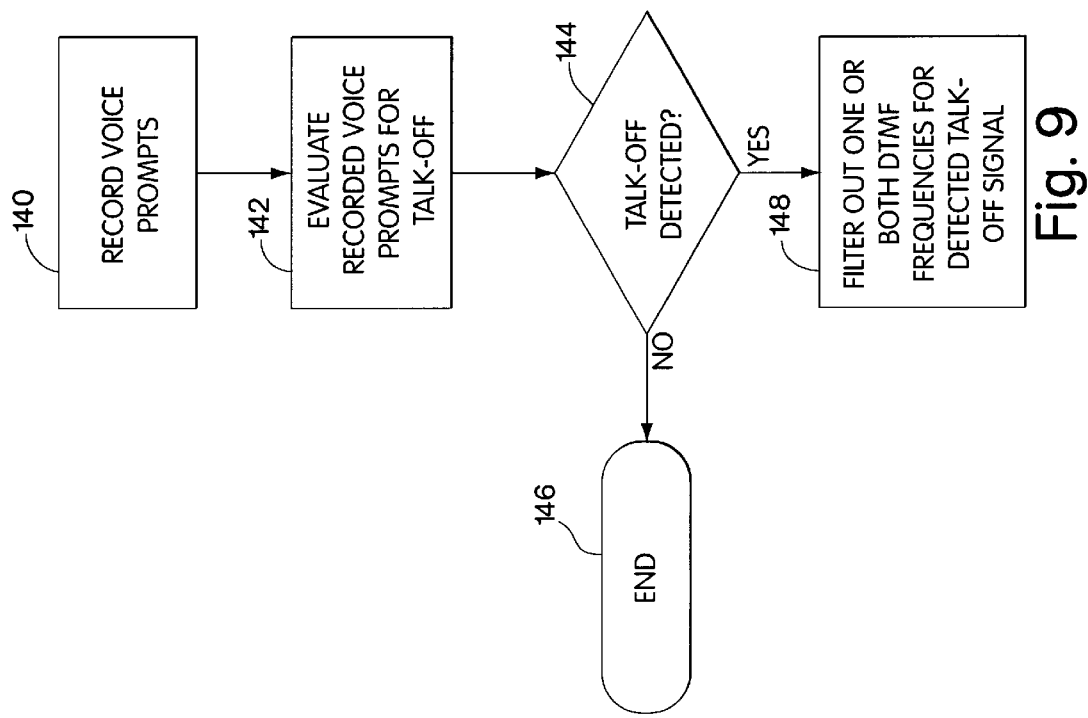
FIG. 9 is a flow chart illustrating the operation of the configuration of FIG. 8.

Referring to FIGS. 8 and 9, an alternative approach involves passing the recorded voice prompts, or other frequently-repeated signals, through the DTMF detector (step 140) to determine whether instances of talk-off are detected (step 142). If no talk-off is detected, no further processing need take place (step 144). If talk-off is detected, the signal can be filtered for one or both of the DTMF frequencies to remove the detected talk-off signal components. This filtering can take place for the entire duration of the signal, or just for a short window, and it can be combined with real-time filtering or used by itself. In some types of systems, excess off-peak processing capacity can be devoted to pre-filtering prompts, messages or other signals.

The filtering operations described above can allow the DTMF detector to be simplified, at least during a "play" state. Since the signal being played includes little energy in the DTMF bands, and because in many applications it is unlikely that a user would be speaking (e.g., at the telephone set 28) at a significantly high volume during playback, the DTMF detector only needs to be sensitive to the frequencies within the DTMF bands. This can allow resources that might otherwise be required by the DTMF detector to be used in other parts of the system. And in the case where both outgoing and incoming DTMF detectors are used, they can each be simplified, since energy outside the DTMF bands does not need to be considered in determining if a DTMF digit is valid.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto. In addition, the order of presentation of the claims should not be construed to limit the scope of any particular term in the claims.

What is claimed is:

1. A communication signaling tone detection system, comprising:

an outgoing signaling tone detector responsive to an output from a first station to a communication channel, the outgoing signaling tone detector having a detection output, an incoming signaling tone detector responsive to an input to the first station from the communication channel, the incoming signaling tone detector having a sensitivity control input, and wherein the sensitivity control input of the incoming signaling tone detector is responsive to the detection output of the outgoing signaling tone detector.

2. The system of claim 1 wherein the incoming and outgoing signal tone detectors are DTMF detectors.

3. The system of claim 1 further including a CODEC operatively connected between the output of the outgoing signaling tone detector, the input of the incoming signaling tone detector, and the communication channel.

4. The system of claim 3 wherein the communication channel is connected to an analog public network telephone line.

5. The system of claim 1 wherein the outgoing signaling tone detector is less sensitive than the incoming signaling tone detector.

6. The system of claim 1 wherein the signaling tone detectors are both implemented as digital filters.

7. The system of claim 1 wherein the detection output of the outgoing signaling tone detector is operative to indicate which of a plurality of predetermined signaling tones the detector has received.

8. A method of detecting signaling tones from a communication channel, comprising:

detecting outgoing signaling tones in a communication stream transmitted from a first station over the communication channel to a second station, detecting incoming signaling tones in a communication stream transmitted from the second station over the communication channel to the first station, and altering at least one attribute of the step of detecting incoming signaling tones based on whether signaling tones are detected by the step of detecting outgoing signaling tones.

9. The method of claim 8 wherein the steps of detecting detect DTMF tones as the signaling tones.

10. The method of claim 8 wherein the step of altering decreases the sensitivity of the step of detecting when the outgoing signaling tones are detected by the step of detecting spurious signals.

11. The method of claim 8 wherein the step of altering temporarily disables the step of detecting.

12. The method of claim 8 wherein the step of altering invalidates a result of the step of detecting incoming signaling tones when a same signaling tone is detected by both the step of detecting outgoing signaling tones and the step of detecting incoming signals.

13. The method of claim 8 wherein the communication stream is an audio stream.

14. The method of claim 8 wherein the step of detecting outgoing tones is less accurate than the step of detecting incoming tones.

15. A communication signaling tone detection system, comprising:

means for detecting outgoing signaling tones in a communication stream transmitted from a first station over the communication channel to a second station, means for detecting incoming signaling tones in a communication stream transmitted from the second station over the communication channel to the first station, and means for altering at least one attribute of the step of detecting incoming signaling tones based on whether outgoing signaling tones are detected by the means for detecting outgoing signaling tones.

16. The system of claim 15 wherein the means for detecting detects DTMF tones as the signaling tones.

17. The system of claim 15 wherein the means for altering includes means for decreasing the sensitivity of the step of detecting when the outgoing signaling tones are detected by the means for detecting outgoing signals.

18. The system of claim 15 wherein the means for altering includes means for temporarily disabling the means for detecting incoming signals.

19. The system of claim 15 wherein the means for altering includes means for invalidating a result of the means for detecting incoming signals when a same signaling tone is detected by both the means for detecting outgoing signaling tones and the means for detecting incoming signaling tones.

20. The system of claim 15 wherein the means for detecting outgoing tones is less accurate than the means for detecting incoming tones.

21. A communication signaling tone detection system, comprising:

a signal characteristic value detector responsive to a communication channel during a measurement period, threshold storage responsive to the signal characteristic value detector, and a threshold detector responsive to the threshold storage and to the communication channel during a detection period, and having a signaling tone reporting output.

22. The system of claim 21 wherein the threshold detector is a DTMF detector.

23. The system of claim 21 wherein the signal characteristic value detector is an amplitude detector.

24. The system of claim 21 wherein the signal characteristic value detector is a twist detector.

25. The system of claim 21 wherein the threshold detector is operative to leave a margin between a threshold value stored by the signal characteristic detector and a detection threshold value.

26. The system of claim 21 wherein the signal characteristic detector and the threshold detector are implemented using a digital signal processor.

* * * * *